3,265,680
POLYMERIZATION OF ISOPRENE
Lawrence E. Forman, Akron, Ohio, Richard S. Stearns, Malvern, Pa., and Richard W. Kibler, Cuyahoga Falls, and Francis A. Bozzacco, Massillon, Ohio, assignors to The Firestone Tire & Rubber Company, Akron, Ohio, a corporation of Ohio
No Drawing. Filed Sept. 11, 1957, Ser. No. 683,234
17 Claims. (Cl. 260—94.2)

This invention relates to a method for producing synthetic rubbery polyisoprene having physical and chemical properties similar to those of natural rubber.

This application is a continuation-in-part of an earlier application of Forman et al. Serial No. 535,254 filed September 19, 1955, now abandoned.

It is well known that Hevea natural rubber is essentially a polyisoprene, containing small amounts of proteins and other substances derived from the rubber tree. Natural rubber is characterized by possessing excellent tack, especially after milling; producing vulcanizates having excellent resilience and low hysteresis properties, high tensile strength and good flexibility at low temperatures; producing gum vulcanizates of high tensile strength; and displaying a crystalline structure when stretched. Heretofore all hydrocarbon synthetic rubbers, in comparison with natural rubber, have shown no crystalline properties, extremely low gum tensile strengths, relatively high hysteresis and low resilence. Although these synthetic rubbers have generally been superior to natural rubber in resisting crack initiation in service, they have been very much inferior in resisting cut growth. The relatively high hysteresis of these synthetic rubbers prevents their use in substantial quantities in production of large tires such as those used on trucks and large off-the-road vehicles.

During the latter part of the past century it was recognized that Hevea natural rubber is a polymer of isoprene, and various attempts were made to produce a true synthetic rubber by polymerizing isoprene. None of these attempts were successful, because the rubbery products obtained possessed properties much inferior to those of natural rubber. Furthermore the polymerization processes were extremely slow, and the rubbery products were mere laboratory curiosities. Butadiene and its homologs were polymerized to produce synthetic rubbers of various types during the early part of the present century, but no commercially acceptable synthetic rubber was produced until about 25 years ago, with the development in Germany of the Buna rubbers (from butadiene-1,3) and in this country of neoprene (from chlorobutadiene). Large scale commercialization of hydrocarbon synthetic rubbers during the past 20 years has been mostly in the field of emulsion polymerization, although the emulsion polymerization technique has never resulted in a hydrocarbon synthetic rubber approaching natural rubber in both gum tensile and hysteresis properties.

It is an object of the invention to provide a synthetic rubber possessing the desirable properties of natural rubber, and especially low hysteresis and high gum tensile strength properties.

Another object is to provide a synthetic rubber possessing the desirable good properties of natural rubber and also some of the unique good properties of synthetic rubbers.

Another object is to provide a method of making the improved synthetic rubbers just mentioned.

A further object is to provide a synthetic rubber capable of replacing, if desired, all natural rubber in critical uses during times of emergency such as in war times.

Other objects of the invention will become apparent as details of the invention are set forth.

SYNOPSIS OF THE INVENTION

It has now been discovered that hydrocarbon lithium compounds may be employed as catalysts in the polymerization of isoprene to produce polymers approximating natural Hevea rubber in microstructure, macrostructure and other desirable properties. The reaction may be carried out by mass polymerization techniques, in which the isoprene, in substantially undiluted form, is contacted with the hydrocarbon lithium catalyst, or by solution technique, in which the isoprene is dissolved in a suitable inert solvent and contacted with the catalyst. The temperature may vary over a wide range, say from $-100°$ C. to $150°$ C., and preferably from $-40°$ to $80°$ C. The isoprene may be in liquid or vapor phase, depending on the temperature and pressure employed.

THE HYDROCARBON LITHIUM CATALYSTS

The hydrocarbon lithium compounds employed as catalysts in the practice of this invention may be any hydrocarbons containing for example from 1 to 40 carbon atoms, in which lithium has replaced hydrogen. Suitable lithium hydrocarbons include for instance alkyl lithium compounds such as methyl lithium, ethyl lithium, butyl lithium, amyl lithium, hexyl lithium, 2-ethyl hexyl lithium, n-dodecyl lithium and n-hexadecyl lithium. Besides the saturated aliphatic lithium compounds, there may also be employed unsaturated compounds such as allyl lithium, methallyl lithium and the like. Aryl, alkaryl and aralkyl lithium compounds such as phenyl lithium, the several tolyl and xylyl lithiums, alpha- and beta-naphthyl lithium and the like are also suitable. It will be understood that mixtures of hydrocarbon lithium compounds individually suitable as above indicated may be used. For instance, catalysts may be prepared by reacting an initial hydrocarbon lithium compound successively with an alcohol and with an olefin such as isopropylene (i.e. a technique analogous to the "Alfin" technique) whereby a greater or lesser proportion of the lithium from the initial hydrocarbon goes to form a lithium alkoxide and to form a new organolithium compound with the olefin. The resultant product may be used as a catalyst in the practice of this invention.

Unlike the hydrocarbon-metal compounds of the alkali metals other than lithium, the catalytic action of the hydrocarbon lithium catalysts employed in this invention does not appear to be affected by the presence of other alkali metal salt compounds. For instance, in the synthesis of hydrocarbon alkali metal compounds, alkali metal halides are produced as by-products. Similarly, in the catalysts produced by the Alfin technique above referred to, alkali metal alkoxides are present. In the catalysis of polymerization with hydrocarbon-metal derivatives of metals other than lithium, these extraneous salts exert considerable, and in many cases essential, effects. In the practice of the present invention, it does not appear that these extraneous salts have any effect whatsoever; they may be left in the hydrocarbon lithium catalyst, or allowed to settle out, without noticeably changing the action of the catalyst.

The hydrocarbon lithium catalysts of this invention may also be used in conjunction with other lithium-dependent catalysts. For instance, in investigations in which the present applicants have been associated, it was discovered that lithium metal, or lithium aryl amides will catalyze the polymerization of isoprene to produce polymers similar to Hevea rubber. The hydrocarbon lithium compounds may be used in admixture with these other catalysts, and when so used will produce polymers of the desirable character of this invention.

THE CONCENTRATION OF CATALYST

As to the amount of catalyst to be used, in general when the reaction is conducted with the isoprene in the liquid phase, i.e., in liquified pure form or dissolved in liquid solvents, the larger the amount of catalyst used, the more rapidly the polymerization will proceed. Countervailing this desirable effect, high concentrations of catalysts tend to lower the molecular weight of the polymers and also spoil the microstructure of the polymeric chains. Based on these considerations, the amount of catalyst employed should be such as to contain not more than 0.1 gram, and preferably not more than 0.02 gram, of carbon-linked lithium, expressed as metallic lithium, per 100 grams of isoprene in the polymerization mixture. There appears to be no theoretical lower limit to the amount of catalyst used; at low concentrations, the catalysts appear to have a high order of efficiency, i.e., if the reaction environment is scrupulously purged of all contaminants such as oxygen, ozone, water, carbon dioxide, etc., which would react with and consume the catalyst, the catalyst appears to be used principally in the production of polymer chains so that, as long as any catalyst is present, some degree of polymerization will take place. For economic reasons of obtaining a rapid reaction rate and optimum reactor utilization, it is preferred to have at least 0.00002 gram of carbon-bonded lithium present per 100 grams of isoprene. The above concentrations are, of course, expressed on the basis of catalyst effectively present in the polymerization mass; if substances which will react with and destroy the catalyst are permitted to enter the reaction zone, the amount of catalyst so destroyed must be subtracted from that supplied in applying the above criteria.

For the purpose of establishing the effective concentration of carbon-linked lithium in any catalyst preparation employed in the practice of this invention, the differential titration technique of Gilman and Haubein, J. Am. Chem. Soc. 66, 1515 (1944), has been found the most suitable procedure, and the concentrations referred to hereinabove and in the claims are to be applied on the basis of analyses made by this method, if any question arises on this point. For most practical purposes, where side reactions are not suspected, simple titration with acid will give reasonably accurate results.

When the polymerization is conducted in the vapor phase, overt concentration considerations are without significance, and the isoprene and catalyst may be supplied in any ratios whatsoever.

THE MICROSTRUCTURE OF PRODUCTS PRODUCED IN ACCORDANCE WITH THE INVENTION

It is understood that Hevea rubber (as well as balata) molecules possess essentially a 1,4-structure, which means that the isoprene units of the molecules are connected to each other as a result of 1,4-addition to produce a linear chain. Each isoprene unit in a molecular chain contains a

group in the center portion thereof. Since this ethylene group is unsymmetrical, both cis and trans-isomers are possible. It has been understood for some time that the Hevea rubber molecules are essentially cis in structure, whereas the balata molecules are essentially trans. As is well known, Hevea rubber is very "rubbery," whereas balata is quite resinous in its properties.

Recent infra-red studies have shown Hevea rubber to consist of about 97.8% cis-1,4-structure and about 2.2% 3,4-structure; balata consists of about 98.7% trans-1,4-structure and about 1.3% 3,4-structure. Typical of GR-S emulsion polymers is the structure of 64% trans-1,4-, 18% cis-1,4- and 18% 1,2-. Rubbery emulsion polyisoprenes generally contain 65% or more of trans-1,4-structure.

The polyisoprene synthetic rubbers produced in accordance with this invention, similarly to Hevea, are essentially linear cis-1,4-polymers. The exact structure of the polymers depends considerably upon the purity of the monomer and the polymerization techniques employed. Isoprene of high purity should be used. The synthetic rubbers show by infra-red technique at least about 75% cis-1,4-structure, no more than about 7 to 10% trans-1,4-structure, no more than about 10% 3,4-structure and essentially no, or at the most only very little, 1,2-structure. The preferred synthetic rubbers produced in accordance with this invention exhibit, by infra-red technique, 90 or more percent cis-1,4-structure, no, or essentially no, trans-1,4-structure or 1,2-structure and no more than about 10% 3,4-structure. Perbenzoic acid oxidation results indicate a typical rubber produced by the invention to possess 94.3% 1,4-structure and Hevea rubber to possess 97.1% 1,4-structure. Total unsaturation, determined by iodine monochloride, for Hevea (pale crepe) was 96% and for a typical synthetic rubber produced in accordance with this invention was 98%.

The proportions of the cis-1,4-, trans-1,4-, 1,2- and 3,4-unsaturation in the polymers produced in accordance with this invention are best determined by means of infra-red analysis. The relative amounts of the four structures named are found by measuring the intensities of the infra-red absorption bands at 8.85, 8.68, 10.98 and 11.25 microns for the four types of structures, in the order given above, and inserting these values into the equation:

$$D^i = e_1^i C_1 + e_2^i C_2 + e_3^i C_3 + e_4^i C_4$$

where $D^i$ = absorbance (optical density) of the polymer at wavelength $i$, $e^i_{1,2,3 \text{ or } 4}$ = the absorptivities of the several structures at wavelength $i$, the subscripts 1, 2, 3 or 4 referring to the several component structures, and $C_{1,2,3 \text{ or } 4}$ = the concentrations of the several structures, the subscripts 1, 2, 3 or 4 referring to the several component structures.

The four equations obtained in this way were solved for $C_1$, $C_2$, $C_3$ and $C_4$, the values of the concentrations of the cis-1,4-, trans-1,4-; 1,2-addition and 3,4-addition of the polymer.

The peak wavelengths selected, and the values of the absorptivities $e^i$ for these wavelengths for the several structures, are tabulated herewith:

| Structure | Molar Absorptivities $e^i$ at Wavelength of— | | | |
|---|---|---|---|---|
| | 8.68 microns | 8.85 microns | 10.98 microns | 11.25 microns |
| 1,2-Addition | 3.0 | 3.0 | 149.0 | 9.0 |
| 3,4-Addition | 1.5 | 2.0 | 7.0 | 145.0 |
| Cis-1,4-Addition | 3.583 | 6.518 | 1.860 | 1.530 |
| Trans-1,4-Addition | 5.927 | 1.934 | 2.277 | 1.885 |

In the detailed examples given hereinafter, percentage values are given for the various types of unsaturation. These are derived by dividing the absolute concentration of each type of unsaturation by the sum of the concentrations of the four types of unsaturation (1,2-; 3,4-; cis- and trans-) determined, and multiplying by 100%, so that the sum of the percentages given will always be 100%. In order to assess the accuracy of the determination, a further figure is given, namely total unsaturation found. This is the quotient of the sum of the concentrations of the various types of unsaturation found by infra-red analysis, divided by the theoretical concentration of all unsaturation which should be present in the sample, assuming that the polyisoprene is constituted solely of

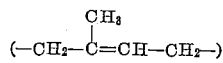

units.

Both liquid phase and vapor phase polymerizations have been successfully utilized in producing new synthetic rubbers by the process of this invention. The polymerization temperatures can range as high as 150° C. or as low as −100° C. As explained hereinafter the reaction rate increases with increasing temperature and with increasing purity of the monomer. Accordingly, if a given reaction rate is required, purity and temperature will be inverse functions of each other—the higher the purity, the lower the temperature required and vice versa. Generally, a sufficiently pure isoprene should be used so that polymerization temperatures no higher than about 70° to 90° C. may be employed. Important factors influencing structure of the polymer and speed of the reaction are:

(1) Purity of monomer
(2) Purity of catalyst
(3) Concentration of moisture, air and oxygen
(4) Temperature of reaction

PURITY OF MONOMER

It has been pointed out previously that isoprene of high purity is required to produce the polymers of the invention. By isoprene of high purity is meant an isoprene of at least more than 90 mole percent purity and preferably in the neighborhood of 95 or more mole percent purity. In general, the purer the isoprene, the faster the reaction rate and the closer the structure and the properties of the resulting polymer to natural rubber. Acetylenic compounds containing hydrogen on a triply-bonded carbon atom are acidic in character, and react directly to destroy the catalyst with production of acetylides; these compounds should be kept at a minimum or removed. Other unsaturated compounds, such as acetylenic compounds containing no hydrogens on the double bonds; olefins; and conjugated olefins other than isoprene do not so actively harm the reaction; but they do use up a certain amount of catalyst; some of them tend to polymerize or copolymerize and to that extent spoil the microstructure of the polymer, and to some extent they lower the molecular weight of the resulting polymer. It is therefore highly recommended that these compounds be removed as far as possible. Any inhibitor normally present in a commercial isoprene must be removed by conventional technique prior to polymerization in accordance with the invention. Excellent polymers in accordance with the invention are produced from Pure Grade [1] or Research Grade [2] isoprene. The only purification required of these monomers prior to use is removal of inhibitor therefrom. Desirable polymers in accordance with the invention are also produced from a less pure grade of isoprene [3] which has a purity of about 91–93% and contains minor amounts of alkyl acetylenes and various other unsaturates, provided the acetylenic compounds are removed and the unsaturated impurities are reduced by well known chemical and fractionating methods to produce a monomer having a purity of about 95% and an index of refraction at 20° C. in the range of about $n_D^{20}=1.4210$ to $1.4216$. In the examples below, isoprene of the above standards of purity was used.

CONCENTRATION OF MOISTURE, AIR AND OXYGEN, ETC.

Moisture in the polymerization zone, since it tends to use up catalyst, should be kept at a minimum. Oxygen and other components of the atmosphere have been found to inhibit polymerization and consequently should as nearly as possible be kept out of the reaction zone. These gaseous materials are conveniently removed by bringing the polymerization charge to a boil and venting a portion (e.g. about 10%) of the charge from the polymerization vessel prior to sealing the same and effecting polymerization. Particularly to be avoided is the presence of oxygenated and nitrogenous organic compounds such as ethers, esters, aldehydes, ketones, primary and secondary amines and the like, which are usually considered essential components of alkali metal catalyst systems: these compounds should be rigorously excluded from the reaction mixtures of this invention. It will be understood that all of the components entering the reaction chamber—monomeric isoprene, catalyst, solvents, equipment components, etc.—should be free from the deleterious materials discussed in the present paragraph and in the preceding paragraph on "Purity of Monomer" so as not to render useless the precautions for purity recommended.

TEMPERATURE

It has been found that the molecular weight and proportion of cis-1,4-structure of the polymers in accordance with the invention generally increase as the temperature of polymerization is decreased. Additionally, the reaction is quite difficult to control at elevated temperatures, particularly where isoprene of the preferred highest purity is employed. It has been found that the gel content of the polymer increases as the polymerization temperature increases especially when lithium dependent catalysts are employed. Consequently, it is desirable to operate at the lowest temperature at which a practical yield of the desired product can be obtained. Since polymerization reactions of the type contemplated frequently require a considerable induction period, it is often desirable to initiate the polymerization reaction at a higher temperature, i.e., at a temperature in excess of 30° C., and then lower the temperature to the desired level by suitable cooling means once the polymerization reaction has been initiated. In this manner, the induction period is lessened and the benefits of low temperature polymerization, as above indicated, are obtained. In general, the polyisoprenes of the invention are produced at temperatures between −100° C. and 150° C. A polymerization temperature of from −40 to 80° C. is preferred.

SOLVENTS

In accordance with the invention, the pure isoprenes essential to the invention may be polymerized in either liquid or vapor phase, but desirably will be carried out in the presence of a suitable inert organic solvent. Solvents operable in the process whereby the polymers of this invention are produced must be non-polar, non-acidic, organic substances. Suitable solvents include the saturated aliphatic hydrocarbon solvents, such as the straight and branched chain paraffins and cycloparaffins containing from 3 to 16 carbon atoms which include, without limitation, propane, pentane, hexane, petroleum ether, heptane, dodecane, cyclopentane, cyclohexane, methyl cyclohexane and the like. Aromatic solvents such as benzene, toluene, xylene and the like are also operable. The same considerations as to purity and absence of interfering compounds applying to the isoprene monomers also apply to the solvent. A treatment which has been found particularly advantageous for the purification of paraffin solvents, such as petroleum ether, consists in agitating the solvent with concentrated sulfuric acid and thereafter repeatedly washing with water. The solvent may then be suitably dehydrated by passage through silica gel, alumina, calcium chloride or other dehydrating or absorbing media, and thereafter distilled. As in the case of the isoprene monomer, the solvent after being purified desirably should be handled in contact only with its own vapor or with atmospheres containing only its vapor and inert gases such as helium and argon.

POLYMERIZATION AND POLYMER RECOVERY OPERATIONS

For small scale laboratory preparations, the polymerization reactions may conveniently be carried out in glass ---
[1] Supplied by Phillips Petroleum Company, Bartlesville, Oklahoma, and represented as having a purity of 99 mole percent and a refractive index at 20° C. of $n_D^{20}=1.422$.
[2] Supplied by Phillips Petroleum Company and represented as having a purity of 99.6 mole percent and a refractive index at 20° C. of $n_D^{20}=1.422$.
[3] Supplied by Enjay Company, Inc.

bottles sealed by crown caps lined with aluminum foil or other flexible, inert sheet material. Before use, the bottles should be dried, for instance by flaming and flushing with helium, argon or other inert gas. It is often desirable, even though the isoprene and solvent (if used) have been previously purified, to subject the materials to a last purification before charging, as for instance by passage through a silica gel adsorption column during the charging. Preferred solvents are aliphatic and aromatic hydrocarbon solvents such as pentane, hexane, heptane, petroleum ether, benzene, cyclopentane and the like. An atmosphere of inert gas such as helium, argon or the like is preferably maintained in the bottle during the charging, to avoid contact of oxygen with the monomer, and it will usually be desirable to complete the purging of oxygen from the system by allowing a portion of the isoprene to evaporate with the bottle loosely capped. The catalyst, which will usually be in the form of a readily flowable solution or suspension of the hydrocarbon lithium, is usually introduced last, just before sealing the crown cap. A hypodermic syringe is a convenient instrument for the handling of the catalyst, since it will keep the catalyst out of contact with the atmosphere. The sealed bottle may either be placed on a polymerizer wheel, arranged to dip and revolve the bottle in a water bath at the desired polymerization temperature; or, after brief shaking or other agitation to mix the catalyst with the other ingredients, the bottle may be allowed to stand quiescent in a medium maintained at the desired polymerization temperature. The polymerization will usually be complete in from 3 to 60 hours, depending on the temperature, catalyst concentration and other pertinent conditions. It is usually necessary to cut open the bottle to remove the polymer. Since the polymer contains no antioxidants, it is extremely susceptible to oxidation. A preferred method of shielding the polymer from oxidation consists in dropping it into a methanol, isopropanol or other alcoholic solution of an antioxidant and agitating the mixture. The alcohol serves as a vehicle for distributing the antioxidant, as an agent to destroy the catalyst, and causes the polymer to separate out from any solvent used in the polymerization mass. The separated polymer is then preferably washed with water on a roll mill, usually with addition of further stabilizing agents, and dried.

Corresponding techniques should be used in large scale polymerizations according to this invention. Usually the reaction will be carried out in a closed autoclave provided with a heat-transfer jacket and with a rotary agitator. Avoidance of oxygen contamination is most easily secured by evacuating the vessel prior to charging the isoprene and solvent (if used) and evaporating and venting a portion of the charge to sweep out any traces of oxygen present. As a precaution for the purity of the monomer and solvent, a silica gel or other suitable adsorption column is preferably inserted in the charging line for these materials. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature, which will usually be maintained between 0° and 150° C.; preferably between −40° and 80° C. Upon completion of the polymerization, the polymerization mass is removed, immersed under the surface of a body of methanol, isopropanol or other alcohol containing an antioxidant, and agitated therewith to precipitate the polymer, destroy the catalyst and incorporate the antioxidant. The precipitated mass may be milled with water on a wash mill to remove the alcohol, additional antioxidant being incorporated during this operation. The product is then dried for storage and use.

The polymers produced in accordance with this invention have the advantageous tack and other working properties of natural Hevea rubber, and when cured with vulcanizing agents customarily used with natural Hevea rubber, yield vulcanizates having tensile strength, both at normal and elevated temperatures, low internal friction, and other physical properties substantially equallizing those of natural Hevea rubber. They may therefore be substituted in all uses for which Hevea natural rubber has heretofore been used, such as pneumatic tires, in particular truck tires, belting, electrical insulation, and the like.

With the foregoing general description in mind, there are given herewith detailed examples of the practice of this invention. All parts given are by weight. In Examples I–IX, the amounts of lithium catalysts used in polymerization are calculated on the basis of lithium entering the synthesis of the catalyst; in Examples X–XV the amounts of lithium used in the polymerization are calculated from the concentration of carbon-linked lithium, expressed as lithium metal, determined by titration of the catalyst preparation with acid.

*Example I.—Mixed catalyst*

A. PREPARATION OF CATALYST

| | |
|---|---|
| Metallic lithium dispersion (37.5% dispersion in white petrolatum), grams | 18.7 |
| N-hexane, ml. | 500 |
| n-Amyl chloride, grams | 53.3 |
| Iodine (small crystals), gram | .05 |
| Butyl bromide, ml. | 2 |
| Isopropyl alcohol (dried), grams | 20.4 |
| Propylene gas | --- |

A lithium metal dispersion and hexane were mixed and cooled to −10° C. and a small portion of the amyl chloride added slowly with high speed stirring. The iodine was then added together with the n-butyl bromide. The mixture was warmed to 20° C. whereupon the reaction began with development of heat. The temperature was again lowered to −10° C. and the remainder of amyl chloride added to the reaction mixture dropwise over a one and one-half hour period. After all the amyl chloride was added, stirring was continued at −10° C. for one hour.

With continued stirring at −10° C. to +5° C. the isopropyl alcohol was added dropwise over a one hour period and the mixture stirred for an additional one-half hour. Thereafter propylene gas was bubbled through the mixture for two hours and stirring continued after the addition of the gas for a further one-half hour. The product was then transferred for storage to a bottle which had been previously swept out with helium.

B. POLYMERIZATION

| | Ml. |
|---|---|
| Isoprene | 40 |
| n-Pentane | 100 |
| Catalyst suspension (prepared as just described) | 18 |

The above ingredients were charged into a 12-ounce beverage bottle, the air swept out by boiling of the isoprene and the bottle capped with a crown cap having an aluminum foil liner. The bottle was placed in a polymerizer wheel which revolved and dipped the bottle in a water bath at 70° C. for 18 hours, after which the bottle was then cooled to room temperature and opened. A small amount (about a gram) of an elastomeric polymer was removed.

*Example II.—Mixed catalyst*

A. PREPARATION OF CATALYST

| | |
|---|---|
| Lithium dispersion (35% dispersion in white petrolatum), grams | 19.8 |
| Pentane, ml. | 500 |
| 1-chloropentane, grams | 53.2 |
| Isopropyl alcohol, grams | 6 |
| Propylene gas | --- |

The apparatus used for the preparation comprised a one-liter three-necked flask having a high speed stirrer, a dropping funnel and a reflux condenser on the respective three necks. The stirrer was provided with an inlet for introducing helium into the interior of the flask. The apparatus was flamed and flushed with helium for 30 minutes before charging. A constant small stream of helium was continuously passed into the reactor during the manipulations described hereafter.

The lithium dispersion and pentane were charged into the apparatus and stirring at 5000 r.p.m. commenced. The 1-chloropentane was added dropwise through the funnel over a period of one and one-half hours, the charge being initially at 18–28° C. but being lowered to about −5° C. after about 10 minutes (which were required to initiate the reaction) and kept at this level for the balance of the time. The isopropyl alcohol was then added dropwise over a period of two hours at a temperature of initially −6° C. which temperature was allowed to rise to 18° C. over the course of the reaction. After the addition of the isopropyl alcohol, propylene gas was introduced below the surface of the reaction mixture over a period of about three hours, the temperature being maintained at about 22° C. The reaction mixture was then blown out of the vessel by helium into a storage bottle which had previously been baked and flushed with helium.

B. POLYMERIZATION

| | |
|---|---|
| Isoprene, grams | 50 |
| n-Pentane, grams | 150 |
| Catalyst (prepared as described above), ml. | 1 |

The above ingredients were charged into a 28-ounce beverage bottle which had previously been flushed with helium, and the bottle capped. The sealed bottle was tumbled into a water bath at 30° C. for 48 hours. At the end of this time the bottle was cut open and the polymer precipitated by adding an isopropanol solution containing a small amount of an amine-type antioxidant, and washed with water on a roll mill. The inherent viscosity of the resultant polymer was 7.54, the gel content was 4.0% and by infra-red analysis the polymer contained 93.6% cis-1,4-; 0.0% trans-1,4-; 0.0% 1,2-; and 6.4% 3,4-unsaturation. The total unsaturation found was 92.2%.

Example III.—Amyl lithium catalyst

A. PREPARATION OF CATALYST

| | |
|---|---|
| Lithium metal dispersion (35% dispersion in white petrolatum), grams | 17.5 |
| Pentane, ml. | 500 |
| 1-chloropentane, grams | 47.3 |

The same apparatus was used in this experiment as in Example II-A. The pentane and lithium metal dispersion were charged into the apparatus, which had been purged with helium, and stirring at 5000 r.p.m. commenced and continued throughout the reaction to follow. The 1-chloropentane was added dropwise through the funnel over a period of two hours at temperatures which rose from −10° C. at the beginning of the reaction to 28° C. at the completion of the reaction. The product was a dark purple homogeneous liquid. The reaction mixture was then pressured into a helium-flushed bottle for storage.

B. POLYMERIZATION

| | |
|---|---|
| Isoprene | 100 grams. |
| n-Pentane | 300 grams. |
| Catalyst (prepared as just described) | 1 ml. (0.01 g. lithium). |

The isoprene and pentane were mixed and passed through a column of activated silica gel which had previously been washed with purified petroleum ether. The mixture was charged into a 28-ounce beverage bottle which had previously been flushed with argon. After venting and before capping, the catalyst was added. The bottle was then capped with an aluminum foil lined crown cap, shaken briefly to mix the ingredients and allowed to stand upright at 25° C. for 18 hours. The mixture became warm and thickened while standing, the main portion of the reaction being completed within six hours. After the completion of the 18 hour period of standing, the bottle was cut open to remove the jelly of polymerized material and solvent. The jelly was mixed with a 2% solution of mercaptobenzimidizole in isopropyl alcohol, which caused the polymer to separate as a coagulum from the pentane solvent. The coagulum mass was removed from the solvent and washed on a roll mill, an additional 3% of mercaptobenzimidizole being added on the mill as antioxidant. The polymer sheeted out nicely on the mill and was dried at 50° C. in a vacuum oven for 18 hours. The polymer had an inherent viscosity of 4.11 and contained no gel. Infra-red analysis indicated it to contain 82.6% cis-1,4-; 9.2% trans-1,4-; 8.2% 3,4-; and the total unsaturation found was 98.6%.

C. COMPOUNDING AND VULCANIZATION

| | Parts |
|---|---|
| Polymer (produced as just described) | 100 |
| Carbon black | 50 |
| Zinc oxide | 3 |
| Lubricant | 26 |
| Softening agent | 3.0 |
| Sulfur | 2.5 |
| Accelerators | 0.5 |
| Retarder | 1.0 |

The above ingredients were milled together and vulcanized into test specimens at 280° F. for 60 minutes. The vulcanizate had the following properties:

| | |
|---|---|
| Tensile strength, pounds per sq. in. | 2275 |
| Modulus of elasticity, pounds per sq. in. | 1975 |
| Elongation, percent | 340 |
| Internal friction | 2.0 |

Example IV.—Influence of catalyst concentration of molecular weight

The procedure of the preceding Example III was exactly repeated in four different experiments except that varying amounts of concentrations of catalyst were used in the several runs. Tabulated herewith are the amounts of catalysts used and the relative viscosities, determined at 25% polymer concentration in normal pentane at 25° C., of the resultant polymers.

TABLE I

| | Run 1 | Run 2 | Run 3 | Run 4 |
|---|---|---|---|---|
| Catalyst used in grams of lithium | 0.01 | 0.008 | 0.006 | 0.004 |
| Relative viscosity | 1 | 1.1 | 90 | 145 |

From the foregoing table it will be seen that decreasing catalyst concentrations result in increasing relative viscosity (and inferentially molecular weight) in the polymeric products produced.

Example V.—Blended batches

A large run was made in accordance with Example III using a number of bottles with the same recipe for each bottle except that the amount of catalyst was reduced to an amount equivalent to .005 gram of lithium in each bottle. The batches were blended, and the blend had the following properties. Inherent viscosity 6.19; 0 gel; and $ML_4$–212 value of 58.5; a Williams plasticity $Y_3$–212 of 4.35 with recovery of 0.43. The infra-red analysis indicated 81.2% cis-1,4-; 10.0% trans-1,4-; 9.4% 3,4-; with a total found unsaturation of 112.8%.

Example VI.—Butyl lithium catalyst

A. PREPARATION OF CATALYST

| | |
|---|---|
| Lithium metal suspension (35% suspension in white petrolatum), gram atom | 1 |
| 1-bromobutane, mole | 0.5 |
| n-Pentane, ml. | 500 |

A butyl lithium catalyst was prepared from the above ingredients by the same apparatus and procedure as in the case of Example III above. The catalyst mixture resulting had a dark blue color.

B. POLYMERIZATION

| | Ml. |
|---|---|
| Isoprene | 84 |
| Petroleum ether | 180 |
| n-Butyl lithium catalyst (prepared as just described) | 3.0 |

The above ingredients were charged into a 28-ounce beverage bottle previously flushed with an inert gas. The bottle was then sealed and placed on a polymerizer wheel in a water bath at 30° C. The polymerization was continued for 18 hours. The bottle was then cut open and the contents coagulated in methanol containing 3% of an amine-type antioxidant. The coagulated polymer was then washed on a water mill and dried in vacuum at 50° C. The infra-red spectrum of the polymer indicated that it contained 77.4% cis-1,4-; 13.0% trans-1,4-; and 9.5% 3,4-unsaturation, the total unsaturation found being 105.9%.

Example VII.—Dodecyl lithium catalyst

A. PREPARATION OF CATALYST

| | |
|---|---|
| Lithium suspension (35% suspension in white petrolatum), gram atom | 1 |
| n-Pentane, ml. | 500 |
| 1-chlorododecane, mole | 0.5 |

A dodecyllithium was prepared from the foregoing ingredients using the same apparatus and procedure as described in Example III. The reaction temperatures ranged 18–20° C. The catalyst solution had a brown color.

B. POLYMERIZATION

| | |
|---|---|
| Isoprene, grams | 50 |
| n-Pentane, grams | 150 |
| Catalyst (prepared as described above), ml. | 2.5 |

The above ingredients were charged into a bottle as described in the preceding examples and polymerized upon a polymerizer wheel dipping into a water bath at 30° C. for 18 hours. The polymers were removed from the bottles and worked up by treatment with methanol and an amine-type antioxidant as described in the preceding examples. Infra-red data indicated that the polymer contained 81.3% cis-1,4-; 9.4% trans-1,4; 9.3% 3,4-unsaturation, the total unsaturation found being 84.1%.

Example VIII.—Phenyl lithium catalyst

A. PREPARATION OF CATALYST

| | |
|---|---|
| Bromobenzene, mole | 0.5 |
| Lithium metal dispersion (35% dispersion in white petrolatum), gram atom | 1 |
| Ethyl ether, ml. | 500 |

The same apparatus was used in this preparation as in Example II-A above. The ethyl ether and lithium dispersion were charged into the flask. Stirring was commenced and bromobenzene added dropwise through the funnel over a period of one and one-half hours, the temperature being maintained in the range 21–30° C. The reaction mixture was then transferred by helium pressure to a one-liter distilling apparatus in which the ether was distilled off while n-heptane was simultaneously added dropwise. The ether was distilled off down to a pot temperature of 25° C. at 150 mm., which conditions were maintained until 250 ml. of n-heptane were also distilled off as a chasing operation to remove the last traces of ether. The remaining catalyst suspension, adjusted to a volume of 500 ml. by addition of n-pentane, was pressured with helium into a bottle for storage.

B. POLYMERIZATION

| | |
|---|---|
| Isoprene, grams | 50 |
| n-Pentane, grams | 150 |
| Phenyl lithium catalyst suspension (prepared as just described), ml. | 1.0 |

The above ingredients were charged into a bottle and polymerized on a polymerizer wheel at 30° C. for 48 hours. The polymer was removed and worked up with a methanol solution of antioxidant as described in the preceding examples. Infra-red analysis indicated that the polymer contained 89.2% cis-1,4-; 2.3% trans-1,4-; and 8.5% 3,4-unsaturation, the total unsaturation found being 83.6%. The inherent viscosity of the product was 6.21 and the gel content was zero.

Example IX

| | |
|---|---|
| Isoprene | 100 grams. |
| n-Pentane | 300 grams. |
| Lithium paste (33% dispersion of lithium in white petrolatum) | .56 gram. |
| Amyl lithium catalyst (prepared as described in Example III–A) | 1 ml. (0.01 g. lithium). |

The isoprene and pentane were mixed and passed through a column of activated silica gel which had previously been washed with purified petroleum ether. The mixture was charged into a 28-ounce beverage bottle, which had previously been flushed with argon. After venting and before capping, the lithium paste and amyl lithium catalyst were added. The bottle was then capped and placed on a polymerizer wheel and revolved at 30° C. for 24 hours. The polymer was removed and worked up as in Example I. Infra-red analysis indicated that the polymer contained 92.8% cis-; no trans- or 1,2-; and 7.2% 3,4-unsaturation, the total found being 86.3%.

Example X.—Amyl lithium—concentration series

A. PREPARATION OF CATALYST

| | |
|---|---|
| Lithium paste (35% dispersion in petrolatum) | 80 grams (4.0 gram-atom of Li metal). |
| Petroleum ether | 1000 ml. |
| 1-chloro-pentane | 212 grams (2.0 moles + 8 grams excess). |

A two liter, three-necked flask provided with a salt-ice bath, an argon purging connection, high-speed stirrer and dropping funnel was used in this preparatiton. The apparatus was flamed and flushed with argon, and the lithium paste and petroleum ether were charged. Stirring at 10,000 r.p.m., and a slow flow of argon through the apparatus were commenced and maintained throughout the reaction to follow. The 1-chloro-pentane was then added dropwise over the course of 90 minutes, the temperature being initially at 20° C. to initiate the reaction, but cooling being applied as soon as the reaction set in so as to keep the temperature in the range −5° C. to +5° C. The reaction mass was then further stirred over a period of two hours, while allowing the temperature to rise to 28° C. The batch, together with after-rinses of petroleum ether, was then pressured over into a glass storage bottle (previously flame-dried and purged with argon) and made up to a volume of 1330 ml. with petroleum ether. Titration with standard acid indicated a concentration of .0068 gram of carbon-linked lithium, expressed as lithium metal, per ml. of the product. Before use, this preparation was allowed to settle completely, so that the catalyst as introduced into the polymerization vessel was substantially free of the lithium chloride by-product.

B. POLYMERIZATION

Isoprene (Phillips Petroleum Co. "Pure" grade isoprene, refluxed with sodium sand and distilled in an inert atmosphere) _____ 100 grams.
Petroleum ether (purified by sulfuric acid, washed and distilled) _____ 300 grams.
Amyl lithium catalyst (prepared as above described) _____ Variable per Table II.

A series of polymerization runs was made in accordance with the foregoing recipe, varying the amount of catalyst from run to run. In each case the petroleum ether and isoprene were passed through a silica gel column and charged into a 28-ounce beverage bottle. The loaded bottle was placed upon a sand bath to boil away about 10% of the charge, after which the amount of catalyst selected for the run was added. Thereafter the bottle was closed with an aluminum-foil-lined crown cap, and then permitted to stand at 25° C. overnight. To recover the polymer, the bottle was cut open and the soft polymer solution was removed. Antioxidant was mixed into the polymer solution, and the polymer was recovered by evaporating the solvent with hot water. Tabulated herewith are the concentrations of the catalyst employed in the several runs, and the structure of the respective polymers as determined by infra-red spectrophotometric analysis:

TABLE II

| Catalyst Used (Grams of carbon-linked lithium, expressed as lithium metal) | Unsaturation Determined by Infra-Red Analysis of Polymer | | | | |
|---|---|---|---|---|---|
| | Cis-1,4 | Trans-1,4 | 1,2 | 3,4 | Total Unsaturation found |
| .00056 | 94.6 | 0.0 | 0.0 | 5.4 | 93.1 |
| .0014 | 87.5 | 4.3 | 0.0 | 8.2 | 90 |
| .0028 | 79.9 | 10.7 | 0.0 | 9.4 | 87.1 |

The above figures show the progressive decrease in cis-1,4-structure with increasing catalyst concentration.

*Example XI.—Ethyl lithium—Temperature series*

A. PREPARATION OF CATALYST

Lithium paste (3% dispersion in petrolatum) _____ 20 grams (1 gram atom of lithium).
Petroleum ether _____ 500 ml.
Ethyl bromide _____ 54.5 grams (0.5 mole).

The apparatus of Example X-A was used in this preparation. The apparatus was flamed and flushed with argon, and the lithium paste and petroleum ether were charged. Stirring at 10,000 r.p.m., and a slow flow of argon through the apparatus were commenced and maintained throughout the reaction to follow. The ethyl bromide was then added dropwise over a period of 25 minutes, the temperature being initially at 21° C. to initiate the reaction, but cooling being applied as soon as the reaction set in, so as to keep the temperature in the range −5° C. to +5° C. The reaction mass was then further stirred for a period of 90 minutes, at the end of which time the reaction mass and petroleum ether washings were pressured into a storage bottle as in Example X-A. The total volume of the reaction mass and washings was 635 ml., and titration with acid indicated a concentration of .0057 gram of carbon-linked lithium, expressed as lithium metal, per ml. of solution.

B. POLYMERIZATION

Isoprene (Phillips Petroleum Co. "Pure" grade isoprene, refluxed with sodium sand and distilled in an inert atmosphere) _____ 100 grams.
Petroleum ether (purified by sulfuric acid, washed with water and distilled over a dry bed of sodium hydroxide) _____ 300 grams.
Ethyl lithium catalyst (prepared as above described) _____ .0023 gram of carbon-linked lithium expressed as lithium metal.

A series of polymerization runs was made in accordance with the foregoing recipe varying in temperature from run to run as indicated in Table III. In each case the petroleum ether and isoprene were passed through a silica gel column and charged into a 28-ounce beverage bottle. The loaded bottle was placed upon a sand bath to boil away about 10% of the charge, after which the catalyst was added and the bottle closed with an aluminum-foil-lined crown cap. The bottle was then placed in a constant temperature bath adjusted to the temperature selected for the run as tabulated hereafter in Table III, and turned end over end in the bath in order to secure agitation. Polymerization was carried out for the duration of time set forth in Table III, at the end of which time the bottle was cut open and the soft polymer solution removed. Antioxidant was mixed into the polymer solution, and the polymer was recovered by evaporating the solvent with hot water.

TABLE III

| Polymerization | | Unsaturation Determined by Infra-Red Analysis of Polymer (Percent) | | | | |
|---|---|---|---|---|---|---|
| Time (hours) | Temp. (° C.) | Cis-1,4 | Trans-1,4 | 1,2 | 3,4 | Total Unsaturation Found |
| 1 | 70 | 85.7 | 3.7 | 0 | 10.6 | 89.6 |
| 2 | 50 | 90.6 | 1.9 | 0 | 7.5 | 89.0 |
| 18 | 30 | 93.2 | 0.0 | 0 | 6.8 | 86.8 |

*Example XII.—Alpha-naphthly lithium large scale polymerization*

A. PREPARATION OF CATALYST

Lithium paste (35% dispersion in petrolatum) _____ 20 grams (1.0 gram atom of lithium).
Diethyl ether _____ 500 ml.
Alpha-bromonaphthalene _____ 103 grams (0.5 mole).

The apparatus of Example X-A was used in this preparation. The apparatus was flame-dried and purged with argon, the lithium paste and diethyl ether charged, stirring commenced at 10,000 r.p.m. and the alpha-bromonaphthalene added dropwise over a period of 1 hour, the temperature being kept in the range of 29°–30° C. during the addition.

The reaction mixture was then transferred under argon pressure to a distilling apparatus (previously flame-dried and purged with argon) where the diethyl ether was distilled off while purified n-heptane was simultaneously added dropwise. When the pot temperature reached 45° C., vacuum was slowly applied and the distillation continued to the final stripping conditions of 30° C. under a pressure of 60 mm. absolute. A total of 1600 ml. of n-heptane was added, and the final volume of the batch was 730 ml., the difference being the amount of n-heptane distilled through as a chaser. The batch was then pressured into a storage bottle, previously dried and filled with argon. Titration with acid indicated a concentration of .0072 gram of carbon-linked lithium, expressed as lithium metal, in the product.

B. POLYMERIZATION

Isoprene ("Pure" grade, manufactured by the Phillips Petroleum Co.; refluxed and distilled over sodium) _____ 30 lbs.
Petroleum ether _____ 120 lbs.
Alpha - naphthyl lithium catalyst (prepared as just described) __ Carbon - linked lithium, expressed as lithium metal.

First portion containing 0.0012 lb.
Second portion containing 0.0006 lb.

A 50-gallon nickel-clad autoclave provided with an anchor-type stirrer and a heating and cooling jacket was used in this run. The reactor was purged with helium and the isoprene and petroleum ether charged into the autoclave through a silica gel column. The first portion of the catalyst was added, the temperature adjusted to 100° F., and agitation commenced. The times cited hereafter are taken from the beginning of the agitation. At the end of 48 hours, no reaction had occurred and the second portion of catalyst was added. At the end of 55 hours the temperature was raised to 122° F. Polymerization set in at some time between 55 and 70 hours from the beginning of the agitation, at which latter time the temperature was lowered to 100° F. The temperature went through a surge to 109° F. at 78 hours, and at the end of 93 hours the charge was run with stirring into a bath of isopropanol containing an antioxidant to precipitate the polymer. The polymer was washed with water and sheeted out on a wash mill, and thereafter dried in an air oven at 50° C. Infra-red analysis indicated the presence of 93.7 cis-; 0.0 trans-; 0.0 1,2-; and 6.3% 3,4-unsaturation, the total unsaturation found being 90.0%. The polymer had an inherent viscosity of 10.4, and contained no gel.

*Example XIII.—Beta-naphthyl lithium*

Grams
Isoprene (refluxed over sodium sand and distilled) _ 100
Petroleum ether (purified by treatment with sulfuric acid, washing with water, drying over magnesium sulfate and distillation over solid potassium hydroxide) _____ 300
Beta-naphthyl lithium catalyst (prepared similarly as in Example XII-A, but using beta-naphthyl bromide instead of alpha-naphthyl bromide) sufficient to contain .0056 gram of carbon-linked lithium expressed as lithium metal.

The isoprene and petroleum ether were charged through a silica gel column into a 28-ounce beverage bottle, which was then heated to boil off approximately 10% of the charge to purge the free space. The catalyst was introduced and the bottle sealed with a crown cap lined with Teflon. The bottle was agitated on a polymerizer wheel in a bath at 50° C. for 112 hours. The resultant polymer solution was worked up as described in Example X above. The resultant polymer showed, on infra-red examination 93.8% cis-; 0.0% trans-; 0.0% 1,2-; and 6.2% 3,4-unsaturation, the total unsaturation found being 92.2%. The polymer contained 5.5% gel and had an inherent viscosity of 10.3.

*Example XIV.—Phenyl lithium*

Grams
Isoprene (Phillips "Pure" grade refluxed and distilled over sodium) _____ 60
Hexane (purified by treatment with sulfuric acid, washing with water and distillation over solid potassium hydroxide) _____ 340
Phenyl lithium catalyst to provide .0018 g. carbon-linked lithium, expressed as lithium metal.

The above ingredients were sealed into a 28-ounce beverage bottle, previously flamed and flushed with helium and revolved on a polymerizer wheel in a water bath at 50° C. for 6.5 hours. The polymer was recovered by agitating the solution with isopropanol containing an antioxidant, and drying in a vacuum oven. Infra-red analysis indicated that the polymer contained 93.0% cis-; 0.0% 1,4- and 1,2-; and 7.0% 3,4-unsaturation, the total unsaturation found being 88.8%.

*Example XV.—4-biphenyl lithium*

Grams
Isoprene (Phillips "Pure" grade, refluxed and distilled over sodium) _____ 100
Petroleum ether (purified by treatment with sulfuric acid, washing and distillation over potassium hydroxide) _____ 300
4-biphenyl lithium catalyst-sufficient to contain 0.004 gram carbon-linked lithium, expressed as lithium metal.

The above ingredients were polymerized and worked up as in the preceding example. Infra-red examination of the polymer indicated that the polymer contained 92.6% cis-; 0.0 trans- and 1,2-; and 7.4% 3,4-unsaturation, the total unsaturation found being 87.8%.

From the foregoing general discussion and detailed specific examples, it will be seen that this invention provides a novel method for the production of synthetic polyisoprenes closely approximating natural Hevea rubber. The lithium compound catalysts, in the amounts used in the process, are a negligible expense, and the process involves only the use of inexpensive and readily secured apparatus.

What is claimed is:

1. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure which process comprises contacting isoprene of a purity in excess of 90 mol percent with a hydrocarbon lithium containing a single atom of lithium per molecule, the hydrocarbon group in said hydrocarbon lithium containing from 1 to 40 carbon atoms, the amount of hydrocarbon lithium being sufficient to provide not more than 0.1 gram of carbon-linked lithium expressed as lithium metal for each 100 grams of isoprene and the polymerization system being essentially free from foreign materials other than hydrocarbons of non-acidic character.

2. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure which process comprises contacting, at —100° C. to 150° C., isoprene of a purity in excess of 90 mol percent with a hydrocarbon lithium containing a single atom of lithium per molecule, the hydrocarbon group in said hydrocarbon lithium containing from 1 to 40 carbon atoms, the amount of hydrocarbon lithium being sufficient to provide not more than 0.1 gram of carbon-linked lithium expressed as lithium metal for each 100 grams of isoprene and the polymerization system being essentially free from foreign materials other than hydrocarbons of non-acidic character.

3. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting, at temperatures in the range of —100° C. to 150° C., isoprene of a purity in excess of 90 mol percent with an aliphatic hydrocarbon lithium containing a single atom of lithium per molecule, the hydrocarbon group in said aliphatic hydrocarbon lithium containing 1 to 40 carbon atoms, the amount of hydrocarbon lithium being sufficient to provide from about .00002 gram to about 0.02 gram of carbon-linked lithium expressed as lithium metal for each 100 grams of isoprene and the polymerization system being essentially free from foreign materials other than hydrocarbons of non-acidic character.

4. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting, at temperatures in the range of −100° C. to 150° C., isoprene of a purity in excess of 90 mol percent with the reaction product of 1 mol of an alkyl lithium in which the alkyl group contains from 1 to 40 carbon atoms successively with one-half mol of an alcohol and one-half mol of an olefin, the amount of said reaction product being sufficient to provide from about .00002 gram to about 0.02 gram of carbon-linked lithium, expressed as lithium metal, for each 100 grams of isoprene, and the polymerization system being essentially free from foreign materials other than hydrocarbons of non-acidic character.

5. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting in an inert solvent, at temperatures in the range of −100° C. to 150° C., isoprene of a purity in excess of 90 mol percent with phenyl lithium, the amount of phenyl lithium being sufficient to provide from about .00002 gram to about 0.02 gram of carbon-linked lithium, expressed as lithium metal, for each 100 grams of isoprene, and the polymerization system being essentially free from foreign materials other than hydrocarbons of non-acidic character.

6. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting in an inert solvent at temperatures in the range of −100° C. to 150° C., isoprene of a purity in excess of 90 mol percent with ethyl lithium, the amount of ethyl lithium being sufficient to provide from about .00002 gram to about 0.02 gram of carbon-linked lithium, expressed as lithium metal, for each 100 grams of isoprene, and the polymerization system being essentially free from foreign materials other than hydrocarbons of non-acidic character.

7. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting, in an inert solvent, at temperatures in the range of −100° C. to 150° C., isoprene of a purity in excess of 90 mol percent with amyl lithium, the amount of amyl lithium being sufficient to provide for about .00002 gram to about 0.02 gram of carbon-linked lithium, expressed as lithium metal, for each 100 grams of isoprene, and the polymerization system being essentially free from foreign materials other than hydrocarbons of non-acidic character.

8. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting, in an inert solvent, at temperatures in the range of −100° C. to 150° C., isoprene of a purity in excess of 90 mol percent with dodecyl lithium, the amount of dodecyl lithium being sufficient to provide from about .00002 gram to about 0.02 gram of carbon-linked lithium, expressed as lithium metal, for each 100 grams of isoprene, and the polymerization system being essentially free from foreign materials other than hydrocarbons of non-acidic character.

9. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting, at temperatures in the range of −100° C. to 150° C., isoprene of a purity in excess of 90 mol percent with the reaction product of 1 mol of an amyl lithium successively with one-half mol of isopropanol and one-half mol of propylene, the amount of said reaction product being sufficient to provide from about .00002 gram to about 0.02 gram of carbon-linked lithium, expressed as lithium metal, for each 100 grams of isoprene, and the polymerization system being essentially free from foreign materials other than hydrocarbons of non-acidic character.

10. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting, in an inert solvent, at temperatures in the range of −100° C. to 150° C., isoprene of a purity in excess of 90 mol percent with phenyl lithium, the amount of phenyl lithium being sufficient to provide from about .00002 gram to about 0.02 gram of carbon-linked lithium, expressed as lithium metal, for each 100 grams of isoprene, and the polymerization system being essentially free from foreign materials other than hydrocarbons of non-acidic character.

11. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting isoprene of a purity in excess of 90 mol percent, in solution in an inert solvent, with ethyl lithium, the amount of ethyl lithium being sufficient to provide from about .00002 gram to about 0.02 gram of carbon-linked lithium, expressed as lithium metal, for each 100 grams of isoprene, and the polymerization system being essentially free from foreign materials other than hydrocarbons of non-acidic character.

12. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting isoprene of a purity in excess of 90 mol percent, in solution in an inert solvent, with amyl lithium, the amount of amyl lithium being sufficient to provide from about .00002 gram to about 0.02 gram of carbon-linked lithium, expressed as lithium metal, for each 100 grams of isoprene, and the polymerization system being essentially free from foreign materials other than hydrocarbons of non-acidic character.

13. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting isoprene, in solution in an inert solvent, with dodecyl lithium, the amount of dodecyl lithium being sufficient to provide from about .00002 gram to about 0.02 gram of carbon-linked lithium, expressed as lithium metal, for each 100 grams of isoprene, and the polymerization system being essentially free from foreign materials other than hydrocarbons of non-acidic character.

14. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting isoprene, in solution in an inert solvent, with the reaction product of 1 mol of amyl lithium successively with one-half mol of an alcohol and one-half mol of an olefin, the amount of said reaction product being sufficient to provide from about .00002 gram to about 0.02 gram of carbon-linked lithium, expressed as lithium metal, for each 100 grams of isoprene, and the polymerization system being essentially free from foreign materials other than hydrocarbons of non-acidic character.

15. Process of polymerizing isoprene to produce a rubbery polyisoprene which, by infra-red analysis, exhibits at least about 75% cis-1,4-structure, not more than about 7 to 10% trans-1,4-structure, not more than about 10% 3,4-structure and essentially no 1,2-structure, which process comprises contacting isoprene of a purity in excess of 90 mol percent, in solution in an inert solvent, with phenyl lithium, the amount of phenyl lithium being sufficient to provide from about .00002 gram to about 0.02 gram of carbon-linked lithium, expressed as lithium metal, for each 100 grams of isoprene, and the polymerization system being essentially free from foreign materials other than hydrocarbons of non-acidic character.

16. A method of polymerizing isoprene to produce a polymer in which at least 90 percent of the isoprene units are united in the cis-1,4-configuration, which method comprises polymerizing said isoprene, of a purity in excess of 90 mol percent, in the presence of a catalyst comprising a mixture of (1) a lithium alkoxide and (2) an alkenyl lithium compound, the alkyl and alkenyl groups in said lithium alkoxide and alkenyl lithium compounds containing from 1 to 40 carbon atoms, the polymerization system being essentially free from foreign materials other than hydrocarbons of non-acidic character.

17. A method of polymerizing isoprene to produce a polyisoprene in which at least 90 percent of the isoprene units are united in the cis-1,4-configuration, which method comprises carrying out the polymerization of said isoprene, of a purity in excess of 90 mol percent, in the presence of a suspension catalyst prepared by the steps of (1) reacting about one mol of metallic lithium with about one-half mol of an alkyl halide containing from 1 to 40 carbon atoms, (2) reacting the step (1) mixture with about 0.3 mol of isopropanol, and (3) treating the step (2) reaction mixture with propylene, the polymerization system being essentially free from foreign materials other than hydrocarbons of non-acidic character.

References Cited by the Examiner

UNITED STATES PATENTS

| | | | |
|---|---|---|---|
| 2,048,169 | 7/1936 | Scott | 260—94.2 |
| 2,146,447 | 2/1939 | Scott | 260—94.2 |
| 2,377,779 | 6/1945 | Hanford et al. | 260—94.9 |
| 2,568,950 | 9/1951 | Crouch | 260—94.2 |
| 2,797,208 | 6/1957 | Burke | 260—94.2 |
| 2,979,494 | 4/1961 | Stearns | 260—94.2 |

FOREIGN PATENTS 339,243 12/1930 Great Britain.

OTHER REFERENCES

Flory: Principles of Polymer Chemistry (1953), page 241; Cornell University Press, Ithaca, N.Y.

Ziegler: Chem. Abs., vol. 34, p. 3671 (1940), original article in Annalen der Chemie, vol. 542, pp. 90–122 (1940).

Ziegler et al.: "Annalen der Chemie," vol. 511, pages 13–77; pages 15, 35, 36 and 41 only needed (1934).

JOSEPH L. SCHOFER, *Primary Examiner.*

BEN E. LANHAM, LESLIE H. GASTON, MORRIS LIEBMAN, LEON J. BERCOVITZ, *Examiners.*

R. E. WEXLER, C. R. REAP, *Assistant Examiners.*

PO-1050
(5/69)

UNITED STATES PATENT OFFICE
CERTIFICATE OF CORRECTION

Patent No. 3,265,680          Dated August 9, 1966

Inventor(s) Lawrence E. Forman, Richard S. Stearns, Richard W. Kibler and Francis A. Bozzacco It is certified that error appears in the above-identified patent and that said Letters Patent are hereby corrected as shown below:

Column 5, line 35, "olefins" should read --diolefins--;

Column 9, line 35, "into" should read --in--;

Column 12, line 53, "preparatition" should read --preparation--;

Column 13, line 52, "3%" should read --35%--;

Column 14, line 46, "naphthly" should read --naphthyl--.

SIGNED AND SEALED

MAR 10 1970

(SEAL)
Attest:

Edward M. Fletcher, Jr.
Attesting Officer

WILLIAM E. SCHUYLER, JR.
Commissioner of Patents